(12) United States Patent
Morita et al.

(10) Patent No.: US 8,998,259 B2
(45) Date of Patent: Apr. 7, 2015

(54) STEERING APPARATUS

(71) Applicant: JTEKT Corporation, Osaka-shi, Osaka (JP)

(72) Inventors: Shigeru Morita, Kashihara (JP); Tatsutomo Yokozeki, Tenri (JP); Isao Hasegawa, Seto (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/329,036

(22) Filed: Jul. 11, 2014

(65) Prior Publication Data

US 2015/0021890 A1    Jan. 22, 2015

(30) Foreign Application Priority Data

Jul. 19, 2013   (JP) ................................ 2013-150806

(51) Int. Cl.
*B62D 1/19*      (2006.01)
*B62D 1/189*     (2006.01)

(52) U.S. Cl.
CPC ................ *B62D 1/195* (2013.01); *B62D 1/189* (2013.01)

(58) Field of Classification Search
CPC ........... B62D 1/19; B62D 1/192; B62D 1/195
USPC ........................................................ 280/777
See application file for complete search history.

(56) References Cited

U.S. PATENT DOCUMENTS

| 4,901,592 | A | 2/1990 | Ito et al. | |
|---|---|---|---|---|
| 2014/0083236 | A1* | 3/2014 | Moriyama et al. | 74/492 |
| 2014/0150595 | A1* | 6/2014 | Riefe et al. | 74/492 |

FOREIGN PATENT DOCUMENTS

| GB | 2264906 A | 9/1993 |
|---|---|---|
| JP | S60-127285 U | 8/1985 |
| JP | U-05-075057 | 10/1993 |

OTHER PUBLICATIONS

Nov. 26, 2014 Search Report issued in European Application No. 14177358.0.

* cited by examiner

*Primary Examiner* — Ruth Ilan
(74) *Attorney, Agent, or Firm* — Oliff PLC

(57) ABSTRACT

A steering apparatus includes an engaging portion movable in a predetermined moving direction at a time of a secondary collision; a fixation portion fixed to a vehicle body; and an absorbing member. The absorbing member includes a fixed portion fixed to the fixation portion, an engaged portion facing the engaging portion, and a connecting portion that includes a curved portion and connects the fixed portion and the engaged portion. An area of a cross-section of the curved portion taken along a plane perpendicular to a creeping direction along the curved portion varies depending on a position in the creeping direction. The connecting portion of the absorbing member is deformed so that the absorbing member absorbs energy of the secondary collision.

14 Claims, 6 Drawing Sheets

STEERING APPARATUS

INCORPORATION BY REFERENCE

The disclosure of Japanese Patent Application No. 2013-150806 filed on Jul. 19, 2013 including the specification, drawings and abstract, is incorporated herein by reference in its entirety.

BACKGROUND OF THE INVENTION

1. Field of the Invention

The present invention relates to a steering apparatus.

2. Description of the Related Art

A shock-absorbing steering column device disclosed in Japanese Utility Model Application Publication No. 5-75057 (JP 5-75057 U) includes a support bracket that supports a steering column on a vehicle body. In the support bracket, a lift bracket welded to a lower surface of an intermediate portion of the steering column is held between a pair of right and left support walls. A circular hole is formed in each of the right and left side walls of the lift bracket, and an elongate hole that is long in the up-down direction is formed in each of portions of the support walls, which correspond to the respective circular holes. An adjustment bolt is inserted from one side of the holes to the other side. A rear end portion of an energy absorbing member is fitted to an outer surface of a portion of an intermediate portion of the adjustment bolt, the portion being present inside the lift bracket. In the energy absorbing member, plural ring portions are connected in series in the front-rear direction by connecting portions. Thus, the entire energy absorbing member has a corrugated shape. The size of the plural ring portions in the width direction gradually changes so as to increase toward the ring portion at the rear end and decrease toward the ring portion at the front end.

In the shock-absorbing steering column device described in JP 5-75057 U, the size of the ring portions of the energy absorbing member in the width direction (the amplitude in the corrugated shape of the energy absorbing member) is changed so that the rigidity of the energy absorbing member is partially changed. Thus, a collision load absorbed by the energy absorbing member at the time of a secondary collision and an amount of deformation of the energy absorbing member are adjusted. In this case, in order to perform the adjustment, it is necessary to greatly change the entire shape of the energy absorbing member depending on the conditions of the secondary collision. Since the space in which the energy absorbing member is provided in the steering column device is limited, the structure of the energy absorbing member is required to be as small as possible.

SUMMARY OF THE INVENTION

An object of the present invention is to provide a steering apparatus in which a size of an absorbing member that absorbs energy of a secondary collision is reduced, and adjustment of the absorbing member is easily performed for absorption of the energy at a time of the secondary collision.

According to an aspect of the present invention, there is provided a steering apparatus including: a bracket that supports a steering shaft connected to a steering member and that is movable toward a downstream side in a predetermined moving direction together with the steering member at a time of a secondary collision; an engaging portion that is disposed so as to be integrally movable together with the bracket; a fixation portion whose relative position with respect to a vehicle body is fixed, the relative position being fixed before and after the secondary collision; and an absorbing member, wherein the absorbing member includes a fixed portion fixed to the fixation portion, an engaged portion facing the engaging portion from the downstream side in the moving direction, and a connecting portion that includes a curved portion and connects the fixed portion and the engaged portion, and an area of a cross-section of the curved portion taken along a plane perpendicular to a creeping direction along the curved portion varies depending on a position in the creeping direction, and wherein at the time of the secondary collision, the connecting portion of the absorbing member is deformed due to engagement between the engaging portion and the engaged portion so that the absorbing member absorbs energy of the secondary collision.

In the steering apparatus according to the above-mentioned aspect, the absorbing member that absorbs the energy of the secondary collision (hereinafter, simply referred to as "energy") in the steering apparatus includes the fixed portion whose relative position is fixed before and after the secondary collision, the engaged portion that is engaged with the engaging portion provided in the bracket on the steering member-side, and the connecting portion that connects the fixed portion and the engaged portion. The connecting portion includes the curved portion, and the area of the cross-section of the curved portion taken along the plane perpendicular to the creeping direction varies depending on the position in the creeping direction.

The curved portion includes a first curved portion having a relatively large cross-sectional area and a second curved portion having a relatively small cross-sectional area. Since the cross-sectional area of the first curved portion is larger than that of the second curved portion, rigidity of the first curved portion is greater. At the time of the secondary collision, the second curved portion having lower rigidity is likely to be deformed earlier than the first curved portion having greater rigidity. Therefore, at the time of the secondary collision, in the absorbing member, the second curved portion is deformed earlier to absorb the energy, and the first curved portion is deformed later to absorb the energy. That is, the second curved portion absorbs the energy in the early stage at the time of the secondary collision, and the first curved portion absorbs the energy at the later stage at the time of the secondary collision. With this configuration, even when the entire shape of the connecting portion is not greatly deformed, the absorbing member can be adjusted for absorption of energy, by adjusting the proportions and the positions of the first curved portion and the second curved portion in the curved portion, and the cross-sectional area difference between the first curved portion and the second curved portion.

As described above, it is possible to reduce the size of the absorbing member that absorbs the energy of the secondary collision, and to easily perform adjustment of the absorbing member for absorption of the energy.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
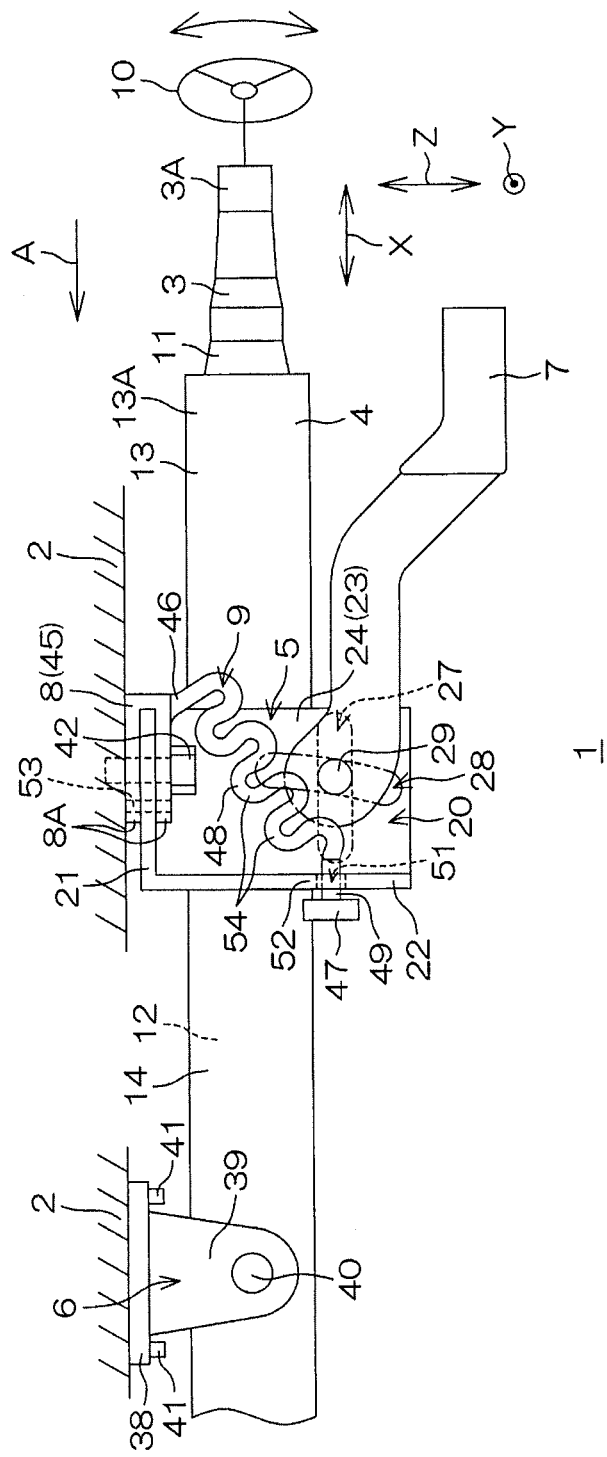
FIG. 1 is a lateral view schematically illustrating a steering apparatus 1 according to an embodiment of the present invention.

Hereinafter, embodiments of the present invention will be described in detail with reference to the accompanying drawings. FIG. 1 is a lateral view schematically illustrating a steering apparatus 1 according to an embodiment of the present invention. In FIG. 1, the left side of the drawing corresponds to the front side of a vehicle body 2, the right side of the drawing corresponds to the rear side of the vehicle body 2, the upper side of the drawing corresponds to the upper side of the vehicle body 2, and the lower side of the drawing corresponds to the lower side of the vehicle body 2. As illustrated in FIG. 1, the steering apparatus 1 mainly includes a steering shaft 3, a steering column 4, an upper bracket 5 (bracket), a lower bracket 6, and a lever 7. The steering apparatus 1 is attached to the vehicle body 2 by using the upper bracket 5 and the lower bracket 6. An end (rear end 3A) of the steering shaft 3 is connected to a steering member 10 such as a steering wheel. The steering apparatus 1 can be subjected to so-called telescopic adjustment (stretching/contraction amount adjustment of the steering column 4) and tilt adjustment (tilt adjustment of the steering column 4) by causing the lever 7 to rotate (details of these adjustments will be described later).

The steering shaft 3 has a substantially cylindrical shape or a substantially columnar shape as a whole. The steering shaft 3 includes an upper shaft 11 and a lower shaft 12 that are coaxially arranged. The upper shaft 11 is located to be closer to the steering member 10 (the rear side) than the lower shaft 12 and is movable in the axial direction of the steering shaft 3 relative to the lower shaft 12. Hereinafter, the extending direction of the steering shaft 3 is defined as an axial direction X. The axial direction X corresponds to the right-left direction in FIG. 1. Directions perpendicular to the axial direction X are defined as a right-left direction Y and an up-down direction Z. The right-left direction Y corresponds to a direction perpendicular to the surface of the drawing paper in FIG. 1, and the up-down direction Z corresponds to an up-down direction in FIG. 1.

The steering column 4 has a substantially cylindrical shape as a whole and accommodates the steering shaft 3. The steering column 4 rotatably supports the steering shaft 3. The steering column 4 includes an upper column 13 and a lower column 14 that are coaxially arranged. The upper column 13 is located so as to be closer to the steering member 10 (the rear side) than the lower column 14 and is movable in the axial direction X relative to the lower column 14.

The upper column 13 and the upper shaft 11 are connected to each other via a bearing (not illustrated) or the like, and the lower column 14 and the lower shaft 12 are connected to each other via a bearing (not illustrated) or the like. Accordingly, the upper column 13 and the upper shaft 11 are movable as an integrated body in the axial direction X relative to the lower column 14 and the lower shaft 12. As a result, the steering column 4 and the steering shaft 3 can be stretched and contracted together.

Figure 2:
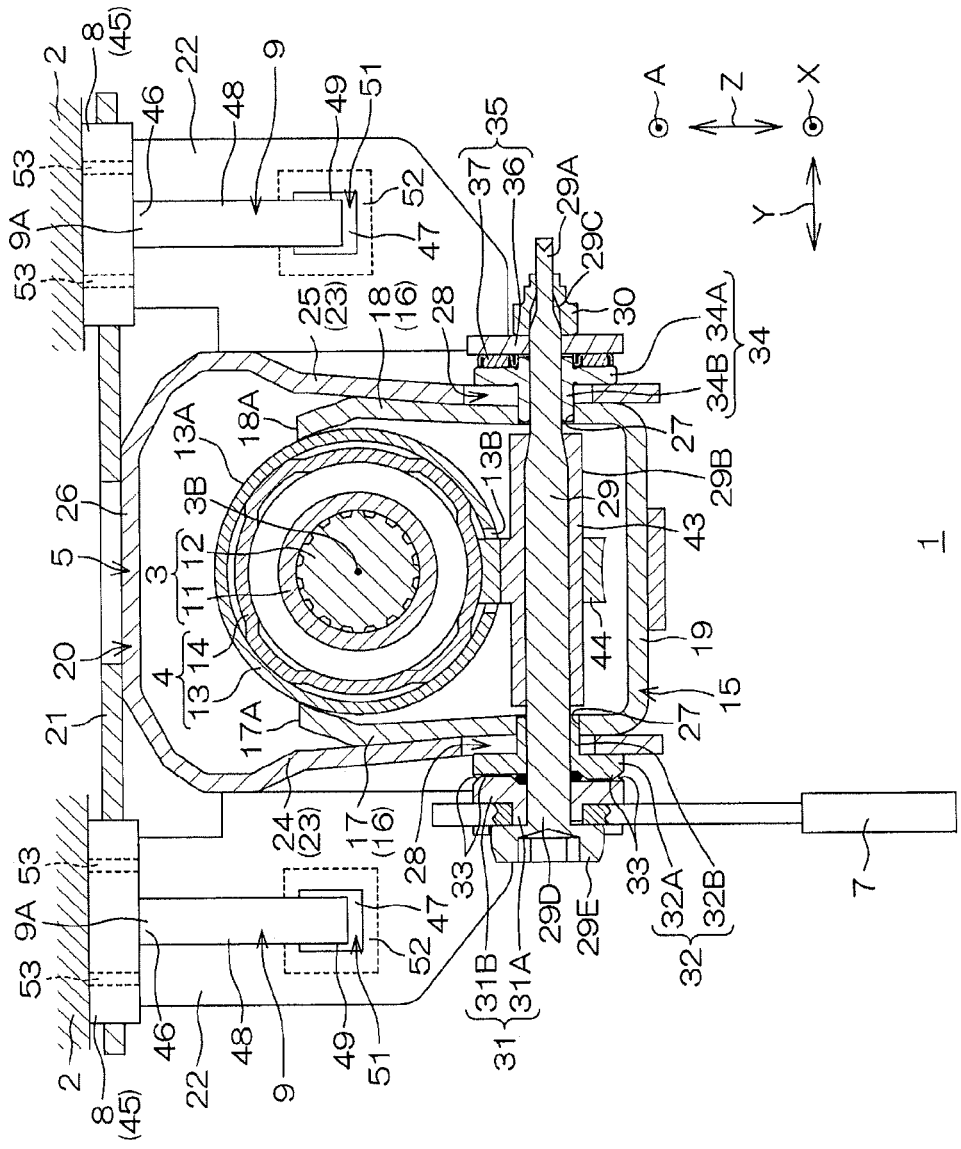
FIG. 2 is a cross-sectional view schematically illustrating the steering apparatus 1 along a right-left direction Y and an up-down direction Z.

FIG. 2 is a cross-sectional view schematically illustrating the steering apparatus 1 along the right-left direction Y and the up-down direction Z. The direction perpendicular to the surface of the drawing paper in FIG. 2 corresponds to the axial direction X in FIG. 1. The up-down direction in FIG. 2 corresponds to the up-down direction Z in FIG. 1. The right-left direction in FIG. 2 corresponds to the right-left direction Y in FIG. 1. The surface side of the drawing paper in FIG. 2 corresponds to the steering member 10-side (the rear side of the vehicle body 2).

Description will be made below with reference to FIG. 2 in addition to FIG. 1. Referring to FIG. 2, the upper bracket 5 supports the steering column 4 (particularly, the upper column 13) and couples the steering apparatus 1 to the vehicle body 2. As described above, since the upper shaft 11 of the steering shaft 3 is coupled to the upper column 13 by using a bearing (not illustrated) interposed therebetween, the upper bracket 5 indirectly supports the steering shaft 3. The upper bracket 5 includes an upper column bracket 15, an upper fixed bracket 20, an attachment stay 21, and a pair of first side plates 22.

The upper column bracket 15 supports the steering column 4 (particularly, the upper column 13) and couples the steering apparatus 1 to the vehicle body 2. The upper column bracket 15 is a groove-shaped (substantially U-shaped when viewed in the axial direction X) member opened upward and is formed to be symmetric about a plane extending in the up-down direction Z through the central axis 3B of the steering shaft 3. Specifically, the upper column bracket 15 includes a pair of side plates 16 (a right side plate 18 and a left side plate 17) facing each other and a connection plate 19 connecting the lower end portions of the right side plate 18 and the left side plate 17 to each other. An upper end portion 18A of the right side plate 18 and an upper end portion 17A of the left side plate 17 are connected to the outer circumferential surface 13A of the upper column 13 by welding or the like.

The upper fixed bracket 20 is a groove-shaped (substantially inverted U-shaped when viewed in the axial direction X) member opened downward and is formed to be symmetric about the plane extending in the up-down direction Z through the central axis 3B. Specifically, the upper fixed bracket 20 includes a pair of second side plates 23 (a right side plate 25 and a left side plate 24) facing each other and a connection plate 26 connecting the upper end portions of the right side plate 25 and the left side plate 24 to each other. The steering shaft 3, the steering column 4, and the upper column bracket 15 are disposed between the second side plates 23 (the right side plate 25 and the left side plate 24) of the upper fixed bracket 20 in FIG. 2.

The right side surface of the corresponding right side plate 18 of the upper column bracket 15 extends along the left side surface of the right side plate 25 of the upper fixed bracket 20. The left side surface of the corresponding left side plate 17 of the upper column bracket 15 extends along the right side surface of the left side plate 24 of the upper fixed bracket 20. Telescopic elongate holes 27 extending in the axial direction X are respectively formed in the right side plate 18 and the left side plate 17 of the upper column bracket 15 (strictly, positions below the upper column 13). Tilt elongate holes 28 are respectively formed in the right side plate 25 and the left side plate 24 of the upper bracket 5.

The attachment stay 21 is fixed to the top surface of the connection plate 26 and has a plate shape extending in the substantially right-left direction Y. The attachment stay 21 may be regarded as a part of the upper fixed bracket 20. Each first side plate 22 has a plate shape that is thin in the axial direction X and that extends in the up-down direction Z and in the right-left direction Y. The first side plates 22 are integrated with the attachment stay 21 and the upper fixed bracket 20, and are symmetric about the steering shaft 3. The first side plates 22 extend downward from both ends of the attachment stay 21 in the right-left direction Y, respectively, and are located on right and left sides of the upper fixed bracket 20, respectively.

Referring to FIG. 1, the lower bracket 6 supports the steering column 4 (particularly, the lower column 14) and couples the steering apparatus 1 to the vehicle body 2. The lower bracket 6 includes a top plate 38, a pair of side plates 39, and a tilt center shaft 40. The top plate 38 has a flat plate shape that is a rectangular shape long in the right-left direction Y when viewed from the up-down direction Z. The top plate 38 is attached to the vehicle body 2 with plural bolts 41.

The side plates 39 extend downward from the top plate 38. The side plates 39 are disposed to face each other in the right-left direction Y, and the steering shaft 3 is interposed therebetween in the right-left direction Y. The tilt center shaft 40 extends in the right-left direction Y and is connected to the lower column 14. The lower bracket 6 supports the lower column 14 by using the tilt center shaft 40. Accordingly, the entire steering column 4 including the lower column 14 is rotatable about the tilt center shaft 40.

Referring to FIG. 2, in the steering apparatus 1, a rotating shaft 29 is disposed at a position extending through the upper column bracket 15 and the upper fixed bracket 20 in the right-left direction Y. The rotating shaft 29 is a columnar member extending in a direction (right-left direction Y) intersecting the axial direction X of the steering shaft 3. A thread groove 29C is formed on the outer circumferential surface 29B at the right end portion 29A of the rotating shaft 29. A head 29E having a larger diameter than the body of the rotating shaft 29 is formed at the left end portion 29D of the rotating shaft 29.

The rotating shaft 29 is inserted into the telescopic elongate holes 27 respectively formed in the right side plate 18 and the left side plate 17 of the upper column bracket 15. The rotating shaft 29 is inserted into the tilt elongate holes 28 respectively formed in the right side plate 25 and the left side plate 24 of the upper bracket 5. The rotating shaft 29 is separated downward from the upper column 13 between the left side plate 17 and the right side plate 18.

A nut 30 to be screwed to the thread groove 29C is disposed at the right end portion 29A of the rotating shaft 29. At the left end portion 29D of the rotating shaft 29, an annular cam 31 and an annular cam follower 32 are disposed between the head 29E and the left side plate 24 of the upper fixed bracket 20. The cam 31 includes a first portion 31A that is in contact with the head 29E from the right side and a second portion 31B that is located on the right side of the first portion 31A and that has a larger diameter than that of the first portion 31A, as an integrated body. The lever 7 is attached to the rotating shaft 29. Specifically, the lever 7 surrounds the outer circumferential surface of the first portion 31A and is fixed in a state where the lever 7 is in contact with the right side surface of the head 29E and the left side surface of the second portion 31B. Accordingly, the lever 7 can cause the rotating shaft 29 and the cam 31 to rotate around the rotating shaft 29 in accordance with the operation of the lever 7.

The cam follower 32 has a first portion 32A and a second portion 32B as an integrated body. The first portion 32A extends along the left side surface of the left side plate 24 of the upper fixed bracket 20. The second portion 32B is fitted to the tilt elongate hole 28 of the left side plate 24 and the telescopic elongate hole 27 of the left side plate 17 of the upper column bracket 15 so as to be movable in the directions in which the telescopic elongate hole 27 and the tilt elongate hole 28 extend. By forming a width across flat or the like in a portion of the second portion 32b, which is fitted to the tilt elongate hole 28 of the left side plate 24, the rotation of the second portion 32B is restricted by the tilt elongate hole 28.

Cam protrusions 33 are formed in the contact surfaces of the cam 31 and the cam follower 32. Accordingly, the cam protrusions 33 of the cam 31 and the cam follower 32 move onto each other due to the relative rotation of the cam 31 and the cam follower 32, whereby the cam 31 causes the cam follower 32 to move in the axial direction of the rotating shaft 29 (toward the right side in the right-left direction Y) and presses the cam follower 32 against the left side plate 24 of the upper bracket 5.

A first intervention member 34 and a second intervention member 35 are interposed between the nut 30 screwed to the right end portion 29A of the rotating shaft 29 and the right side plate 25 of the upper fixed bracket 20. The first intervention member 34 includes a first portion 34A and a second portion 34B as an integrated body. The first portion 34A extends along the right side surface of the right side plate 25. The second portion 34B is fitted to the tilt elongate hole 28 of the right side plate 25 and the telescopic elongate hole 27 of the right side plate 18 of the upper column bracket 15 so as to be movable in the directions in which the telescopic elongate hole 27 and the tilt elongate hole 28 extend. By forming a width across flat or the like in a portion of the second portion 34B, which is fitted to the tilt elongate hole 28 of the right side plate 25, the rotation of the second portion 34B is restricted by the tilt elongate hole 28.

The second intervention member 35 includes a thrust washer 36 that is interposed between the first portion 34A of the first intervention member 34 and the nut 30 and a needle roller thrust bearing 37 that is interposed between the thrust washer 36 and the first portion 34A of the first intervention member 34. The nut 30 can smoothly rotate together with the rotating shaft 29 due to the function of the second intervention member 35 including the needle roller bearing 37.

When the cam 31 rotates relative to the cam follower 32 due to the operation of the lever 7, the cam follower 32 moves in the axial direction of the rotating shaft 29 (toward the right side in the right-left direction Y). Since the second side plates 23 of the upper fixed bracket 20 are held between, and fastened by the moved cam follower 32 and the first intervention member 34, the second side plates 23 are pressed against the corresponding side plates 16 of the upper column bracket 15.

Accordingly, the steering column 4 is fixed in the axial direction X and the up-down direction Z (this state is referred to as a fixed state), whereby tilt lock and telescopic lock are achieved.

A tubular pressing member 43 is fitted to an outer surface of the rotating shaft 29. The pressing member 43 is disposed between the side plates 16 in the right-left direction Y. An eccentric cam 44 that protrudes in the radial direction of the rotating shaft 29 is fitted to an outer surface of the center of the pressing member 43 in the right-left direction Y. The pressing member 43 rotates together with the rotating shaft 29. When the steering column 4 is in the fixed state, the eccentric cam 44 moves into a through-hole 13B formed in the upper column 13, and presses the lower column 14 against the upper column 13. Backlash between the lower column 14 and the upper column 13 is eliminated by the pressing.

Next, the lever 7 is rotated from this state in a direction opposite to the direction in which the lever 7 is rotated in the above description. Due to the rotation of the lever 7, the cam 31 rotates relative to the cam follower 32. Accordingly, the cam follower 32 moves in the axial direction of the rotating shaft 29 (toward the left side in the right-left direction Y). The second side plates 23 of the upper fixed bracket 20, which have been fastened, are released between the cam follower 32 and the first intervention member 34. Accordingly, the second side plates 23, which have been pressed against the corresponding side plates 16, are released. As a result, the steering column 4 is movable in the axial direction X and the up-down direction Z (this state is referred to as a released state) and thus it becomes possible to perform the tilt adjustment and the telescopic adjustment. Specifically, the telescopic adjustment can be performed by causing the rotating shaft 29 to move along the telescopic elongate hole 27, and the tilt adjustment can be performed based on the rotational motion about the tilt center shaft 40 by causing the rotating shaft 29 to move along the tilt elongate hole 28. In the released state, since the eccentric cam 44 retreats from the through-hole 13B to the outside of the steering column 4, the lower column 14, which has been pressed against the upper column 13, is released.

Figure 3:
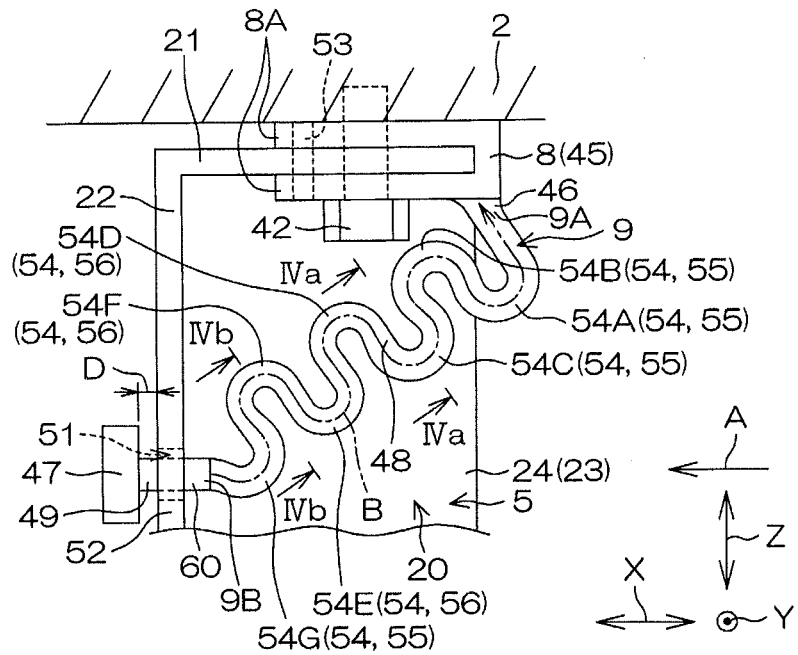
FIG. 3 is an enlarged view of a main part in FIG. 1.

FIG. 3 is an enlarged view of a main part in FIG. 1. The postures of the members in FIG. 3 are the same as in FIG. 1. Description will be made below with reference to FIG. 3 in addition to FIGS. 1 and 2. The steering apparatus 1 includes a pair of capsules 8 that fixes the upper bracket 5 to the vehicle body 2. The capsules 8 are respectively provided on the attachment stay 21 at positions on both sides of the steering shaft 3 in the right-left direction Y. Each capsule 8 is attached from the rear side of the vehicle body 2. In FIG. 2, the capsules 8 are illustrated without using cross-sections thereof. Referring to FIG. 3, each capsule 8 includes, for example, two plate members 8A arranged in the up-down direction Z and has a shape (a substantially U shape inclined to the front side of the vehicle body 2) in which ends of the two plate members 8A are connected. In each capsule 8, the attachment stay 21 is held between the two plate members 8A from the upper and lower sides, and thus, the capsules 8 support the entire upper bracket 5.

In the attachment stay 21, a cut groove (not illustrated) is formed in a portion to which each capsule 8 is attached, from the rear side of the vehicle body 2. In the upper bracket 5, resin pins 53 are inserted into the circumferential edges around the cut grooves. Each resin pin 53 extends through the two plate members 8A of the corresponding capsule 8 and the attachment stay 21. Thus, the capsule 8 is positioned with respect to the upper bracket 5 by using the cut groove. In this state, the capsule 8 is fixed to the vehicle body 2 by using a bolt 42 and the bolt 42 extends through the two plate members 8A of the capsule 8 from the lower side and is inserted into the cut groove. Accordingly, the upper bracket 5 is positioned with respect to the vehicle body 2 by using the capsules 8, and is movable to the front side in a state where the capsules 8 are left on the vehicle body 2, by breaking the resin pins 53. In this state, the capsule 8 serves as a fixation portion 45 whose relative position with respect to the vehicle body 2 is fixed.

Absorbing members 9 are respectively provided on the lower plate members 8A of the capsules 8. The paired absorbing members 9 are respectively arranged on both sides of the steering shaft 3 in the right-left direction Y (see FIG. 2). Each absorbing member 9 includes a fixed portion 46, an engaged portion 47, a connecting portion 48, and an idling portion 49. The fixed portion 46 is disposed in a rear end portion (that is also an upper end portion) 9A in each absorbing member 9. The fixed portion 46 is fixed, for example, to a part behind the bolt 42 in each capsule 8 (the fixation portion 45).

The engaged portion 47 is disposed in a front end portion 9B in each absorbing member 9. The engaged portion 47 has a plate shape that is thin in the axial direction X and that extends in the right-left direction Y and the up-down direction Z. The engaged portion 47 is located ahead of the corresponding first side plate 22. In this state, the engaged portion 47 faces the corresponding first side plate 22 from the front side. A rectangular insertion hole 51 as viewed in the axial direction X is formed in each first side plate 22. The insertion hole 51 overlaps with the engaged portion 47 when viewed in the axial direction X and is smaller than the engaged portion 47 when viewed in the axial direction X (see FIG. 2).

The connecting portion 48 has a width w and a thickness t and has a plate shape connecting the rear end portion 9A (the fixed portion 46) of the absorbing member 9 and the front end portion 9B (the engaged portion 47). Here, the width w is a size in the thickness direction of the plate-shaped connecting portion 48, and the thickness t is a size in the right-left direction Y. The connecting portion 48 includes plural continuous curved portions 54. In the connecting portion 48, the curved portion 54 protruding to the front-upper side (to the upper-left side in FIG. 3) and the curved portion 54 protruding to the rear-lower side (to the lower-right side in FIG. 3) are alternately arranged. Accordingly, the connecting portion 48 including the plural curved portions 54 forms a corrugated shape that meanders from the fixed portion 46 to the engaged portion 47 when viewed in the right-left direction Y.

Figure 4A:
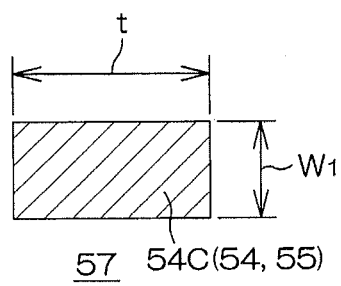
FIG. 4A is a cross-sectional view of a curved portion 54 taken along a line IVa-IVa in FIG. 3.
Figure 4A:
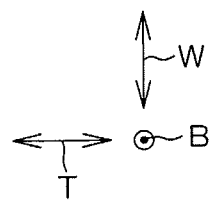
Figure 4B:
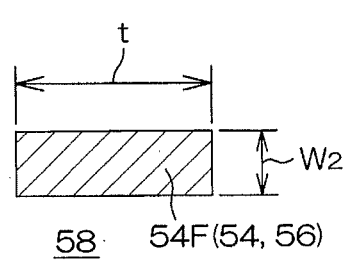
FIG. 4B is a cross-sectional view of the curved portion 54 taken along a line IVb-IVb in FIG. 3.
Figure 4B:
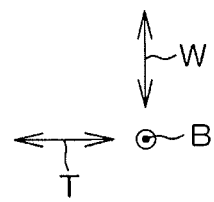

In this embodiment, the connecting portion 48 of each absorbing member 9 includes seven curved portions 54. The curved portions 54 in each absorbing member 9 are denoted by reference signs 54A, 54B, 54C, 54D, 54E, 54F, and 54G sequentially from the rear end portion 9A to the front end portion 9B. FIG. 4A is a cross-sectional view of the curved portion 54 taken along a line IVa-IVa in FIG. 3, and FIG. 4B is a cross-sectional view of the curved portion 54 taken along a line IVb-IVb in FIG. 3.

Description will be made below with reference to FIGS. 4A and 4B in addition to FIGS. 1 to 3. A creeping direction (the direction indicated by an alternate long and short dash arrow in FIG. 3) along the curved portions 54 constituting the connecting portion 48 is denoted by reference sign B. The direction perpendicular to the surface of the drawing paper in FIG. 4A corresponds to the creeping direction B at the center (the center in the creeping direction B) of the curved portion 54C. The right-left direction in the surface of the drawing paper of FIG. 4A corresponds to the right-left direction Y and the up-down direction in the surface of the drawing paper of FIG. 4A corresponds to the direction along the line IVa-IVa. The direction perpendicular to the surface of the drawing paper of FIG. 4B corresponds to the creeping direction B at the center (the center in the creeping direction B) of the curved portion 54F. The right-left direction in the surface of the drawing paper of FIG. 4B corresponds to the right-left direction Y and the up-down direction in the surface of the drawing paper of FIG. 4B corresponds to the direction along line IVb-IVb. The up-down direction in the surface of the drawing paper of FIGS. 4A and 4B is also the width direction W of the curved portions 54 constituting the connecting portion 48, and the right-left direction of the surface of the drawing paper of FIGS. 4A and 4B is also the thickness direction T of the curved portions 54 constituting the connecting portion 48.

The size (width) of the curved portions 54 in the width direction W is the width w of the connecting portion 48 and the size of the curved portions 54 in the thickness direction T is the thickness t of the connecting portion 48. In this embodiment, the thickness t is uniform over the entire area in the creeping direction B, but the width w1 of the curved portion 54C (see FIG. 4A) is larger than the width w2 of the curved portion 54F (see FIG. 4B). The width of the curved portions 54A, 54B, and 54G is equal to the width $W_1$ of the curved portion 54C, and the width of the curved portions 54D and 54E is equal to the width $W_2$ of the curved portion 54F. That is, in the connecting portion 48 of this embodiment, the area of the cross-section (cross-section taken along a plane perpendicular to the creeping direction B, and the same applies to the following) of the curved portions 54 on the side of the end portion 9A is larger than that of the curved portions 54 on the side of the end portion 9B, except for the curved portion 54G.

Thus, the cross-sectional area and the width W of the plural curved portions 54 vary depending on the positions of the curved portions 54 in the creeping direction B. Among the plural curved portions 54, the curved portions 54 (the curved portions 54A, 54B, 54C, and 54G) having a larger cross-sectional area are referred to as first curved portions 55 and the curved portions 54 (the curved portions 54D, 54E, and 54F) having a smaller cross-sectional area are referred to as second curved portions 56.

The cross-section of the first curved portions 55 taken along the plane perpendicular to the creeping direction B is referred to as a first cross-section 57 (see FIG. 4A). The cross-section of the second curved portions 56 taken along the plane perpendicular to the creeping direction B is referred to as a second cross-section 58 (see FIG. 4B). In the case where the width W of the curved portions 54 is varied depending on the positions in the creeping direction B as in this embodiment, the first curved portions 55 and the second curved portions 56 can be simultaneously formed by press working or the like, and it is thus possible to reduce the cost as compared to a case where the first curved portions 55 and the second curved portions 56 are formed by post-working.

In this embodiment, the difference between the area of the first cross-section 57 and the area of the second cross-section 58 is caused by the difference in the width W. Instead of this configuration, a substantial difference may be provided between the area of the first cross-section 57 and the area of the second cross-section 58, by forming a cut portion in each second curved portion 56 by post-working or forming a through-hole (performing punching in the thickness direction T or the width direction W by using a press) in a state where the width $W_1$ of the first curved portions 55 and the width $W_2$ of the second curved portions 56 are kept equal to each other.

In the connecting portion 48, a linear portion 60 extending along the axial direction X is disposed ahead of the curved portion 54G. The absorbing member 9 is inserted into the insertion hole 51 at the linear portion 60, and the linear portion 60 is smaller than the insertion hole 51 in the right-left direction Y and the up-down direction Z. The idling portion 49 is disposed in the linear portion 60 of the connecting portion 48. Strictly, the idling portion 49 is a portion in the linear portion 60, which is located between the engaged portion 47 and the first side plate 22. The idling portion 49 is formed by separating the engaged portion 47 by a predetermined idling gap D from the first side plate 22. The idling gaps D in the right and left absorbing members 9 are equal to each other.

An operation of the steering apparatus 1 at the time of secondary collision will be described below. At the time of so-called secondary collision, when the steering apparatus 1 receives a shock transmitted from the steering member 10, the upper bracket 5 (attachment stay 21) moves toward a downstream side in a predetermined moving direction A (toward the front side of the vehicle body 2 in the axial direction X) together with the steering member 10. The downstream side in the moving direction A corresponds to the front side of the vehicle body 2 and the upstream side in the moving direction A corresponds to the rear side of the vehicle body 2.

The movement of the upper bracket 5 due to the secondary collision will be described below in more detail. When the steering apparatus 1 receives an impact with a predetermined intensity or more, the resin pins 53 extending through the attachment stay 21 and the capsules 8 are broken. Then, the attachment stay 21 slides toward the front side relative to the two plate members 8A of the capsules 8. Thus, the upper bracket 5 moves toward the downstream side, and is separated from the capsule 8. The load (impact load at the time of a secondary collision) absorbed by the breaking of the resin pins 53 and the friction between the capsules 8 and the attachment stay 21 is referred to as a separation load.

Due to the movement of the upper bracket 5, the upper column 13 moves toward the downstream side. In other words, the steering column 4 and the steering shaft 3 move toward the front side. At this time, the relative positions of the capsules 8 with respect to the vehicle body 2 are continuously fixed, the capsules 8 being attached to the vehicle body 2 by using the bolts 42. Thus, the capsules 8 position the upper bracket 5 with respect to the vehicle body 2 before the secondary collision, and allow the movement of the upper bracket 5 toward the downstream side in the moving direction A at the time of the secondary collision. The relative positions of the capsules 8 with respect to the vehicle body 2 are fixed before and after the secondary collision.

Figure 5:
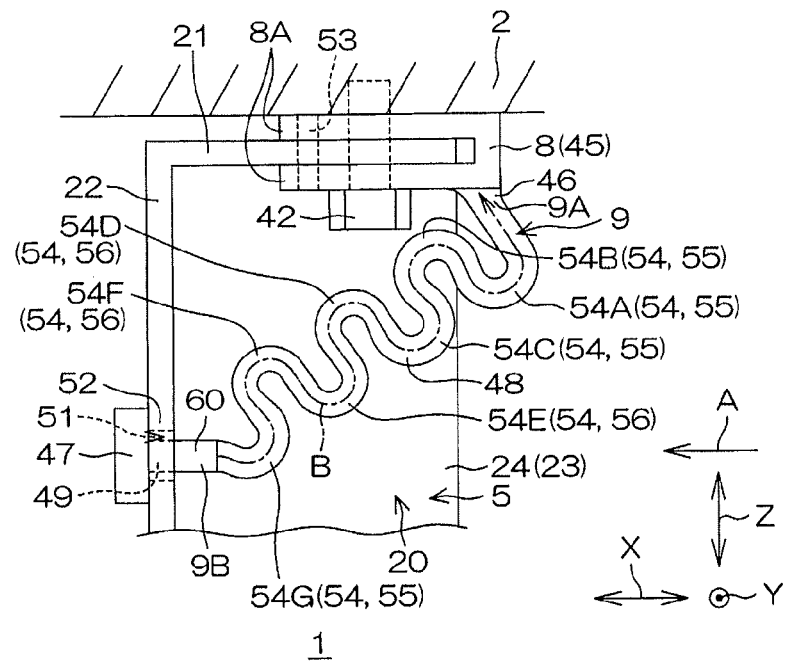
FIG. 5 is a diagram illustrating a time point at which an engaging portion 52 engages with an engaged portion 47 due to a secondary collision in FIG. 3.
Figure 6:
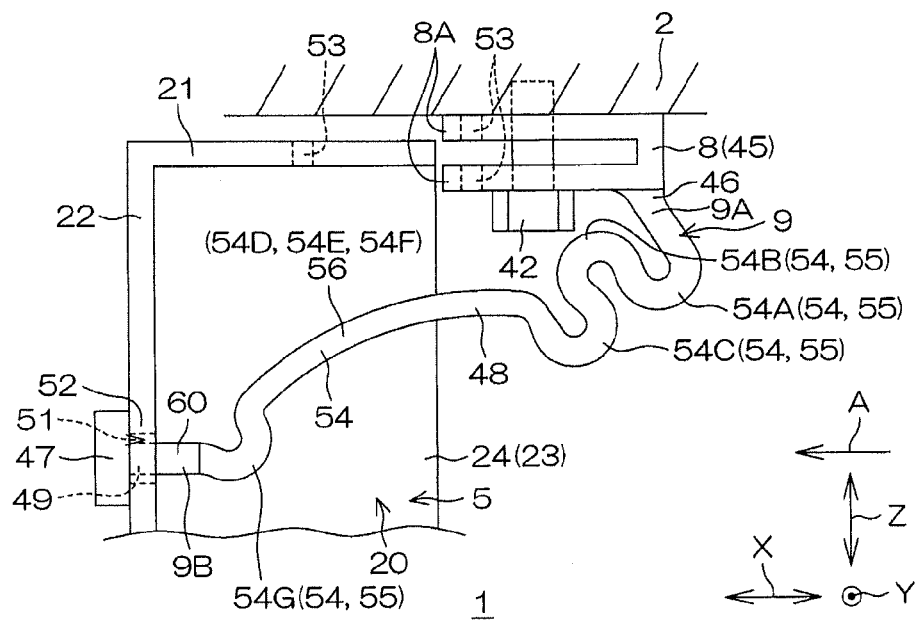
FIG. 6 is a diagram illustrating a time point at which second curved portions 56 are deformed due to the secondary collision in FIG. 3.
Figure 7:
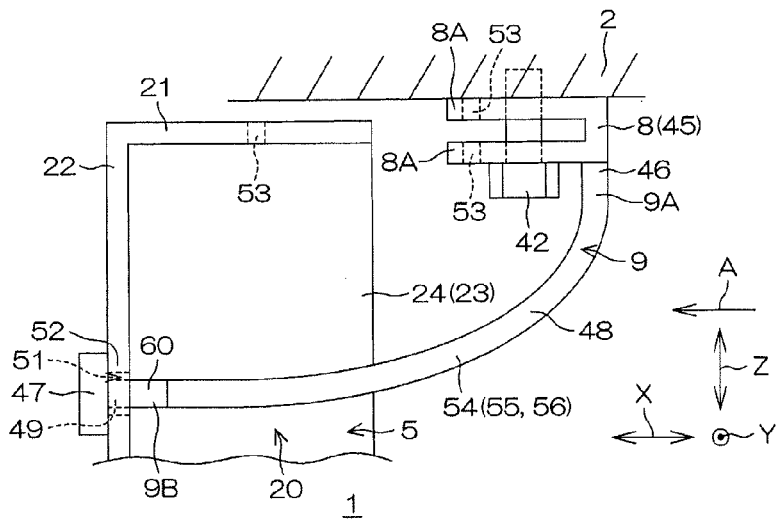
FIG. 7 is a diagram illustrating a state where the curved portions 54 are completely deformed due to the secondary collision in FIG. 3.

FIG. 5 is a diagram illustrating a time point at which the engaging portion 52 engages with the engaged portion 47 due to the secondary collision in FIG. 3. FIG. 6 is a diagram illustrating a time point at which the second curved portions 56 are deformed due to the secondary collision in FIG. 3. FIG. 7 is a diagram illustrating a state where the curved portions 54 are completely deformed due to the secondary collision in FIG. 3. The postures of the members in FIGS. 5, 6, and 7 correspond to those in FIG. 1.

Description will be made with reference to FIGS. 5 to 7 in addition to FIGS. 1 to 4. Referring to FIG. 5, when the upper bracket 5 moves toward the downstream side due to the secondary collision, the first side plate 22 moves toward the downstream side, specifically, toward the engaged portion 47 of the absorbing member 9. Accordingly, the idling gap D before the secondary collision decreases, and the engaged portion 47 finally engages (comes in contact) with the circumferential edge around the insertion hole 51 in the first side plate 22. The timing at which the engaged portion 47 of the right absorbing member 9 engages with the circumferential edge is the same as the timing at which the engaged portion 47 of the left absorbing member 9 engages with the circumferential edge. When the portion of the first side plate 22 engaging with the engaged portion 47 is the engaging portion 52, the engaged portion 47 faces the engaging portion 52 from the downstream side in the moving direction A before and after the secondary collision (see FIG. 3).

In the state illustrated in FIG. 3 before the secondary collision, the idling portion 49 separates the engaged portion 47 toward the downstream side in the moving direction A by the predetermined idling gap D from the engaging portion 52. Since the first side plate 22 is integrated with the attachment stay 21, the engaging portion 52 is integrally movable together with the upper bracket 5. Accordingly, the engaging portion 52 engages with the engaged portion 47 after the engaging portion 52 moves (idles) toward the downstream side by the idling gap D from the state before the secondary collision.

Referring to FIG. 6, after the engaged portion 47 engages with the engaging portion 52, the upper bracket 5 having the engaging portion 52 tends to further move toward the downstream side together with the engaged portion 47 so as to absorb the above-mentioned impact load. At this time, in the absorbing member 9, the engaged portion 47 moves in a direction away from the fixed portion 46 and thus the connecting portion 48 is pulled toward the downstream side. Since the first curved portions 55 (the curved portions 54A, 54B, 54C, and 54G) have a cross-sectional area larger than that of the second curved portions 56 (the curved portions 54D, 54E, and 54F) (the area of the first cross-section 57 is larger than the area of the second cross-section 58), the first curved portions 55 have greater rigidity. Accordingly, at the time of the secondary collision, the second curved portions 56 having smaller rigidity are likely to be deformed earlier than the first curved portions 55 having greater rigidity. When the connecting portion 48 is pulled toward the downstream side, the second curved portions 56 having small rigidity among the plural curved portions 54 are first deformed. That is, the curved portions 54 (the curved portions 54D, 54E, and 54F) on the side of the engaging portion 52 (on the side of the end portion 9B) in the connecting portion 48 are mainly deformed. Accordingly, the substantially central portion of the connecting portion 48 becomes substantially linear. Due to this deformation, the upper bracket 5 further moves toward the downstream side and the steering column 4 and the steering shaft 3 further move toward the downstream side.

Referring to FIG. 7, after the second curved portions 56 are stretched almost fully, the first curved portions 55 having greater rigidity are deformed later so as to further absorb the energy due to the secondary collision. That is, the curved portions 54 (the curved portions 54A, 54B, 54C, and 54G) on the side of the fixation portion 45 (on the side of the end portion 9A) in the connecting portion 48 are mainly deformed. Accordingly, the entire connecting portion 48 becomes substantially linear. Due to this deformation, the upper bracket 5 further moves toward the downstream side, and the steering column 4 and the steering shaft 3 also further move toward the downstream side.

Thus, in the absorbing member 9 at the time of the secondary collision, the second curved portions 56 (mainly the curved portions 54 on the side of the engaging portion 52) are deformed earlier to absorb energy, and the first curved portions 55 (mainly the curved portions 54 on the side of the fixation portion 45) are deformed later than the second curved portions 56 to absorb energy. Accordingly, the absorbing member 9 is smoothly stretched. The load absorbed by the deformation of the plural curved portions 54 constituting the connecting portion 48 and the contraction of the steering column 4 and the steering shaft 3 is referred to as an EA load.

That is, the second curved portions 56 serve to absorb the energy in the early stage at the time of the secondary collision (strictly, the energy due to the EA load in the early stage of the secondary collision), and the first curved portions 55 serve to absorb the energy in the later stage at the time of the secondary collision (strictly, the energy due to the EA load in the later stage of the secondary collision). In this case, the amounts of energy absorption in the early stage and the later stage can be adjusted separately at the time of the secondary collision. The requirements for each vehicle can be satisfied, for example, by decreasing the energy absorbed in the early stage and slowly increasing the energy absorbed in the later stage. Thus, at the time of the secondary collision, the connecting portion 48 of the absorbing member 9 is deformed due to the engagement between the engaging portion 52 and the engaged portion 47 so that the absorbing member 9 absorbs the energy due to the secondary collision.

With this configuration, even when the entire shape of the connecting portion 48 is not greatly deformed, the absorbing member 9 can be adjusted for absorption of energy, by adjusting the proportions and the positions of the first curved portions 55 and the second curved portions 56 among the curved portions 54, and the cross-sectional area difference between the first curved portions 55 and the second curved portions 56. As described above, it is possible to reduce the size of the absorbing member 9 that absorbs the energy of the secondary collision and to easily adjust the absorbing member 9 for absorbing the energy of the secondary collision.

As described above, the plural curved portions 54 form a meandering corrugated shape. Accordingly, by folding the absorbing member 9 so that the absorbing member 9 has a small size before the secondary collision, it is possible to reduce the size of the absorbing member 9. Further, by employing the curved portions 54 having the corrugated shape, it is possible to increase an amount of deformation at the time of the secondary collision, and thus, it is possible to effectively absorb the energy of the secondary collision.

Figure 8A:
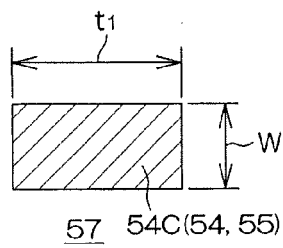
FIGS. 8A and 8B are diagrams illustrating a first modification example of the present invention applied to FIGS. 4A and 4B.
Figure 8B:
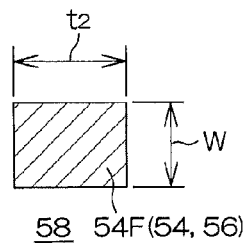

A first modification example of the present invention will be described below. FIGS. 8A and 8B are diagrams illustrating the first modification example of the present invention applied to FIGS. 4A and 4B. The postures of the members in FIGS. 8A and 8B correspond to those in FIGS. 4A and 4B. In FIGS. 8A and 8B, the same members as those described above will be denoted by the same reference signs and description thereof will not be repeated. Description will be made below with reference to FIGS. 8A and 8B in addition to FIGS. 1 to 7. In the plural curved portions 54 in the above-mentioned embodiment, the width W of the curved portions 54 varies depending on the positions in the creeping direction B. That is, the connecting portion 48 includes the portions having locally different cross-sectional areas (rigidities) due to the difference in the plate width (the width W).

On the other hand, referring to FIGS. 8A and 8B, in the plural curved portions 54 of the first modification example, the width W is uniform in the entire range in the creeping direction B. However, in the plural curved portions 54 of the first modification example, the thickness t of the curved portions 54 varies depending on the positions in the creeping direction B. Since the thickness $t_1$ of the first curved portions 55 is larger than the thickness $t_2$ of the second curved portions 56, the rigidity of the first curved portions 55 is greater than that of the second curved portions 56. In the first modification example as well as the embodiment of the present invention, the second curved portions 56 having smaller rigidity among the plural curved portions 54 are first deformed at the time of the secondary collision (see FIG. 6). Then, in order to further absorb the energy of the secondary collision, the first curved portions 55 having greater rigidity are deformed. Accordingly, the entire connecting portion 48 finally becomes substantially linear (see FIG. 7).

It is possible to easily realize the configuration in which the thickness t of the curved portions 54 varies depending on the positions in the creeping direction B as in the first modification example, by press working or the like, and thus it is possible to reduce the cost as compared to a case where the first curved portions 55 and the second curved portions 56 are formed by post-working. In the first modification example, only the thickness t of the curved portions 54 varies depending on the positions in the creeping direction B. However, the thickness t and the width W of the curved portions 54 may vary depending on the positions in the creeping direction B.

Figure 9:
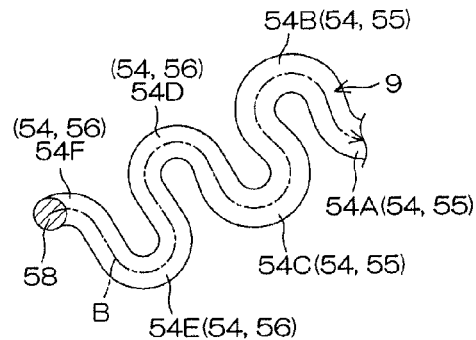
FIG. 9 is a perspective view of a connecting portion 48 according to a second modification example of the present invention.
Figure 10:
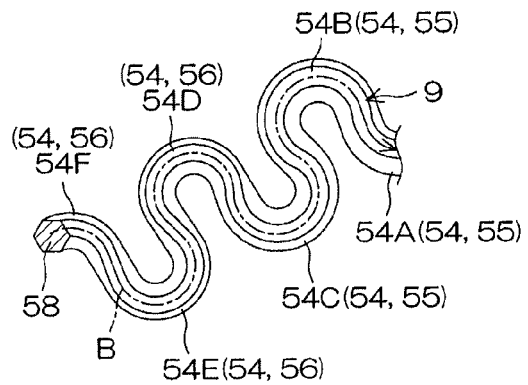
FIG. 10 is a diagram illustrating a third modification example of the present invention applied to FIG. 9.
Figure 11:
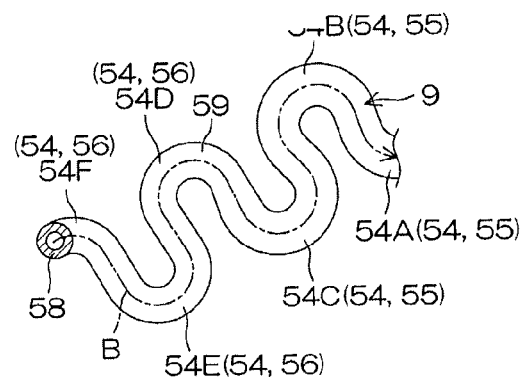
FIG. 11 is a diagram illustrating a fourth modification example of the present invention applied to FIG. 9.

A second modification example, a third modification example, and a fourth modification example of the present invention will be described below. FIG. 9 is a perspective view of a connecting portion 48 according to the second modification example of the present invention. FIG. 10 is a diagram illustrating the third modification example of the present invention applied to FIG. 9. FIG. 11 is a diagram illustrating the fourth modification example of the present invention applied to FIG. 9. The cross-section illustrated on the left side in each of FIGS. 9 to 11 is the second cross-section 58 (the cross-section of the curved portion 54F). The left surface side in each of FIGS. 9 to 11 corresponds to the front side of the vehicle body 2 and the right deep side in each of FIGS. 9 to 11 corresponds to the rear side of the vehicle body 2. In FIGS. 9 to 11, the same members as those described above will be denoted by the same reference signs and description thereof will not be repeated.

Description will be made with reference to FIGS. 9 to 11 in addition to FIGS. 1 to 8. Referring to FIG. 9, in plural curved portions 54 constituting a connecting portion 48 in the second modification example of the present invention, the cross-section (including the first cross-section 57 and the second cross-section 58 not illustrated in FIG. 9) at any position in the creeping direction B has a circular shape. In this case, the second cross-section 58 needs to have a smaller diameter than the diameter of the first cross-section 57 in at least one position in the creeping direction B, in the individual curved portion 54. With this configuration, since the area of the first cross-section 57 is larger than the area of the second cross-section 58 and the rigidity of the first curved portions 55 is greater than the rigidity of the second curved portions 56, the second curved portions 56 are more easily deformed than the first curved portions 55. That is, in the second modification example as well as in the above-mentioned embodiment (including the first modification example), the second curved portions 56 are first deformed at the time of the secondary collision and the first curved portions 55 are deformed after the second curved portions 56 are deformed.

The first cross-section 57 and the second cross-section 58 may not have a precise circular shape, and may have an elliptical shape. Each of the cross-sections needs to have a plane surface shape having a closed area. Referring to FIG. 10, in plural curved portions 54 constituting a connecting portion 48 in the third modification example of the present invention, the cross-section (including the first cross-section 57 and the second cross-section 58) at any position in the creeping direction B has a hexagonal shape. In this case as well, the second cross-section 58 needs to be smaller than the first cross-section 57 in at least one position in the creeping direction B, in the individual curved portion 54. With this configuration, the area of the first cross-section 57 is larger than the area of the second cross-section 58 and the rigidity of the first curved portions 55 is greater than the rigidity of the second curved portions 56, and thus the second curved portions 56 are more easily deformed than the first curved portions 55. That is, in the third modification example as well, the second curved portions 56 are first deformed at the time of the secondary collision and the first curved portions 55 are deformed after the second curved portions 56 are deformed.

Each of the first cross-section 57 and the second cross-section 58 does not necessarily need to have a hexagonal shape, and may have a polygonal shape. Referring to FIG. 11, plural curved portions 54 constituting a connecting portion 48 in the fourth modification example of the present invention include a tubular member 59 extending in the creeping direction B. The cross-section (including the first cross-section 57 and the second cross-section 58) of the curved portion 54 at any position in the creeping direction B has an annular shape (strictly, a circular ring shape). In this case, the areas of the cross-sections may be adjusted using the inner diameters of the first cross-section 57 and the second cross-section 58 or the areas of the cross-sections may be adjusted using the outer diameters thereof.

When the areas of the cross-sections are adjusted using the outer diameters, the outer diameter of the second curved portions 56 is set to be smaller than the outer diameter of the first curved portions 55. When the areas of the cross-sections are adjusted using the inner diameters, the inner diameter of the second curved portions 56 is set to be larger than the inner diameter of the first curved portions 55. Accordingly, the area of the second cross-section 58 can be made smaller than the area of the first cross-section 57 and thus the rigidity of the second curved portions 56 can be set to be smaller than the rigidity of the first curved portions 55.

When a difference in the outer diameter and the inner diameter is not provided between the first curved portions 55 and the second curved portions 56, the rigidity of the second curved portions 56 can be set to be smaller than that of the first curved portions 55 by deforming the second curved portions 56. An example of the specified method is a method of deforming parts of the curved portions 54 into a flat shape so that the parts become the second curved portions 56, by applying a force to the curved portions 54 from the outside in the radial direction of the cross-section. Thus, the second curved portions 56 can be formed by simple post-working in which the curved portions 54 are depressed by applying an external force to the curved portions 54.

Figure 12:
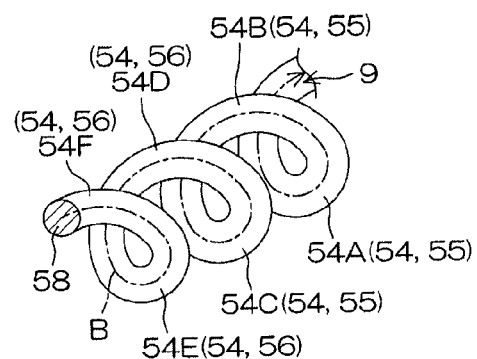
FIG. 12 is a diagram illustrating a fifth modification example of the present invention applied to FIG. 9.

A fifth modification example of the present invention will be described below. FIG. 12 is a diagram illustrating the fifth modification example of the present invention applied to FIG. 9. In FIG. 12, the cross-section illustrated on the left side of the surface of the drawing paper corresponds to the second cross-section 58. In FIG. 12, the same members as those described above will be denoted by the same reference signs and description thereof will not be repeated. Description will be made below with reference to FIG. 12 in addition to FIGS. 1 to 11.

A connecting portion 48 according to the fifth modification example of the present invention has a coil shape extending in a spiral manner from the fixed portion 46 to the engaged portion 47. The entire connecting portion 48 has a substantially corrugated shape when viewed in the right-left direction Y. The connecting portion 48 includes plural curved portions 54 curved in a spiral manner. In this case, each of the first cross-section 57 and the second cross-section 58 may have a circular shape or a polygonal shape. Each of the first cross-section 57 and the second cross-section 58 may have an annular shape. Thus, since the connecting portion 48 has a three-dimensional spiral shape, it is possible to increase the amount of deformation of the curved portions 54 (the connecting portion 48) at the time of the secondary collision, as compared to the case where the absorbing member 9 has a two-dimensional shape. The connecting portion 48 in the fifth modification example has a spiral shape, but does not necessarily need to be elastically deformed. The connecting portion 48 needs to be plastically deformed in a direction in which a spiral extends, at the time of the secondary collision.

The present invention is not limited to the above-mentioned embodiments, and may be modified in various forms without departing from the scope of the appended claims. For example, the first curved portions 55 include the curved portions 54A, 54B, 54C, and 54G and the second curved portions 56 include the curved portions 54D, 54E, and 54F, but the present invention is not limited to this configuration. At least one of the plural curved portions 54 needs to be the first curved portion 55 and at least one of the plural curved portions 54 needs to be the second curved portion 56. In brief, the area of the cross-section of the plural curved portions 54 taken along a plane perpendicular to the creeping direction B needs to locally vary in at least one position in the creeping direction B.

The second curved portion 56 does not necessarily need to be disposed substantially at the center of the connecting portion 48, and may be disposed to be close to the fixed portion 46 or may be disposed to be close to the engaged portion 47. The first curved portions 55 and the second curved portions 56 may be alternately arranged in the creeping direction B.

The number of the curved portions 54 does not necessarily need to be seven, and may be smaller than seven or may be larger than seven. The curved portions 54 do not necessarily need to be classified into two types, in other words, the first curved portion 55 and the second curved portion 56, and the area of the cross-section taken along the plane perpendicular to the creeping direction B may be classified into three or more types depending on the positions in the creeping direction B or may be continuously changed.

The curved portions 54 do not necessarily need to be continuous. That is, a linear portion or the like may be disposed in an intermediate position of the connecting portion 48. The curved portions 54 do not necessarily need to be disposed over the entire range of the connecting portion 48, and may be disposed only in a part of the connecting portion 48. The curved portions 54 may not form a corrugated shape. For example, the curved portions 54 may form an arc-like shape that is curved in one direction to a large extent.

The engaging portion 52 and the engaged portion 47 may engage with each other before the secondary collision. In this case, the idling portion 49 and the idling gap D are not provided. The engaged portion 47 does not necessarily need to have a plate shape extending in the right-left direction Y and the up-down direction Z. The engaged portion 47 needs to have a shape engaged with the engaging portion 52. For example, the engaged portion 47 may a rod-shaped member having a T shape extending in any one of the right-left direction Y and the up-down direction Z. The engaged portion 47 may be formed by bending the front end portion 9B into an L shape. The engaged portion 47 may be provided as a component separate from the connecting portion 48 or may be formed by welding a metal sphere or the like to the front end portion 9B of the absorbing member 9. In addition, the engaged portion 47 as a separate component may be attached to the front end portion 9B by clinching, a nut, or the like.

The engaging portion 52 does not necessarily need to be disposed in the circumferential edge around the insertion hole 51, and may be disposed in another part in the first side plate 22. The engaging portion 52 needs to be disposed in a component moving together with the steering column 4 at the time of the secondary collision, and does not necessarily need to be disposed in the first side plate 22. In this case, the engaging portion 52 is disposed in a part of the upper bracket 5, as the circumferential edge around the insertion hole, a groove, a key-shaped structure, or the like.

Only one absorbing member 9 may be provided in the steering apparatus 1. Accordingly, it is possible to reduce the number of components. In this case as well, the portion in which the engaging portion 52 is disposed is not limited to the circumferential edge around the insertion hole 51. In this case, in order to uniformly distribute the EA load in the upper bracket 5, the engaging portion 52 is preferably disposed at a position close to the steering column 4.

The fixation portion 45 does not necessarily need to be disposed in the capsule 8. The fixation portion 45 needs to be disposed in a portion that is fixed to the vehicle body 2 before and after the secondary collision. In this embodiment, the first side plates 22 are integrated with the attachment stay 21 and the upper fixed bracket 20 as the integrated body. However, the first side plates 22 may be integrated with any one of the attachment stay 21 and the upper fixed bracket 20 as an integrated body.

The apparatus, in which the absorbing member 9 is used, is not limited to the steering apparatus 1 in which tilt adjustment and telescopic adjustment can be performed, and the absorbing member 9 may be applied to all steering apparatuses including a steering apparatus in which only one of the tilt adjustment and the telescopic adjustment can be performed. The steering apparatus 1 may be applied to an electric power steering system in which the steering operation is assisted by an electric motor, or may be applied to a manual steering system in which the steering assist using the electric motor is not performed.

What is claimed is:

1. A steering apparatus comprising:
    a bracket that supports a steering shaft connected to a steering member and that is movable to a downstream side in a predetermined moving direction together with the steering member at a time of a secondary collision;
    an engaging portion that is disposed so as to be integrally movable together with the bracket;
    a fixation portion whose relative position with respect to a vehicle body is fixed, the relative position being fixed before and after the secondary collision; and
    an absorbing member,
    wherein the absorbing member includes a fixed portion fixed to the fixation portion, an engaged portion facing the engaging portion from the downstream side in the moving direction, and a connecting portion that includes a curved portion and connects the fixed portion and the engaged portion, and an area of a cross-section of the curved portion taken along a plane perpendicular to a creeping direction along the curved portion varies depending on a position in the creeping direction, and
    wherein at the time of the secondary collision, the connecting portion of the absorbing member is deformed due to engagement between the engaging portion and the engaged portion so that the absorbing member absorbs energy of the secondary collision.

2. The steering apparatus according to claim 1, wherein the area of the cross-section is larger on a side of the fixation portion than on a side of the engaging portion, in the connecting portion.

3. The steering apparatus according to claim 2, wherein the curved portion extends in a spiral manner from the fixed portion to the engaged portion.

4. The steering apparatus according to claim 2, wherein the curved portion has a plate shape having a width and a thickness, and the width of the curved portion varies depending on the position in the creeping direction.

5. The steering apparatus according to claim 2, wherein the curved portion has a plate shape having a width and a thickness, and the thickness of the curved portion varies depending on the position in the creeping direction.

6. The steering apparatus according to claim 2, wherein the curved portion includes a tubular member that extends in the creeping direction.

7. The steering apparatus according to claim 1, wherein the curved portion has a corrugated shape meandering from the fixed portion to the engaged portion.

8. The steering apparatus according to claim 7, wherein the curved portion has a plate shape having a width and a thickness, and the width of the curved portion varies depending on the position in the creeping direction.

9. The steering apparatus according to claim 7, wherein the curved portion has a plate shape having a width and a thickness, and the thickness of the curved portion varies depending on the position in the creeping direction.

10. The steering apparatus according to claim 7, wherein the curved portion includes a tubular member that extends in the creeping direction.

11. The steering apparatus according to claim 1, wherein the curved portion has a plate shape having a width and a thickness, and the width of the curved portion varies depending on the position in the creeping direction.

12. The steering apparatus according to claim 1, wherein the curved portion has a plate shape having a width and a thickness, and the thickness of the curved portion varies depending on the position in the creeping direction.

13. The steering apparatus according to claim 1, wherein the curved portion includes a tubular member that extends in the creeping direction.

14. The steering apparatus according to claim 1, wherein the curved portion extends in a spiral manner from the fixed portion to the engaged portion.

* * * * *